Feb. 7, 1933.  D. W. SESSIONS  1,896,977
LIFTING JACK FOR VEHICLES
Filed July 14, 1930  2 Sheets-Sheet 1
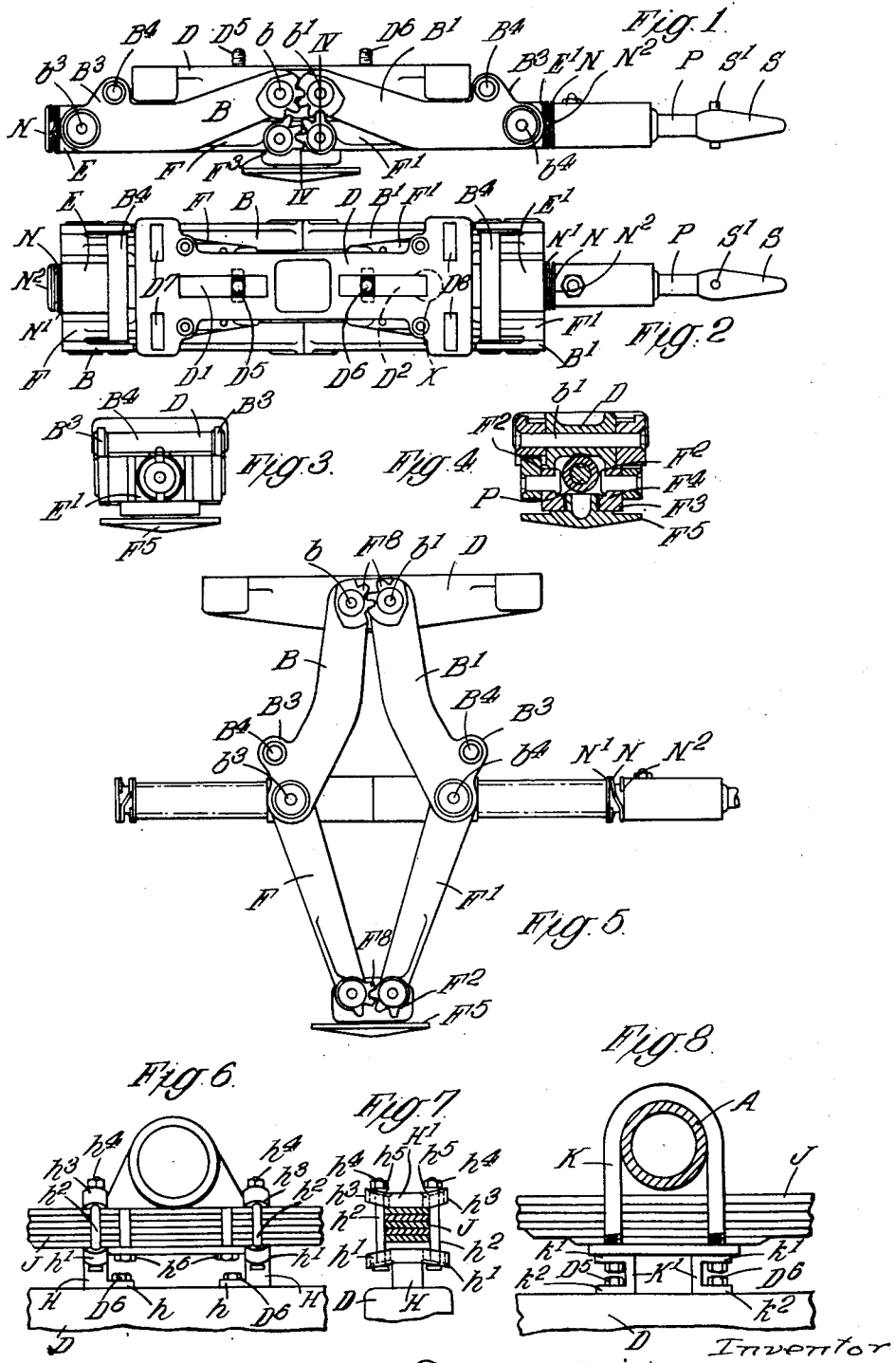

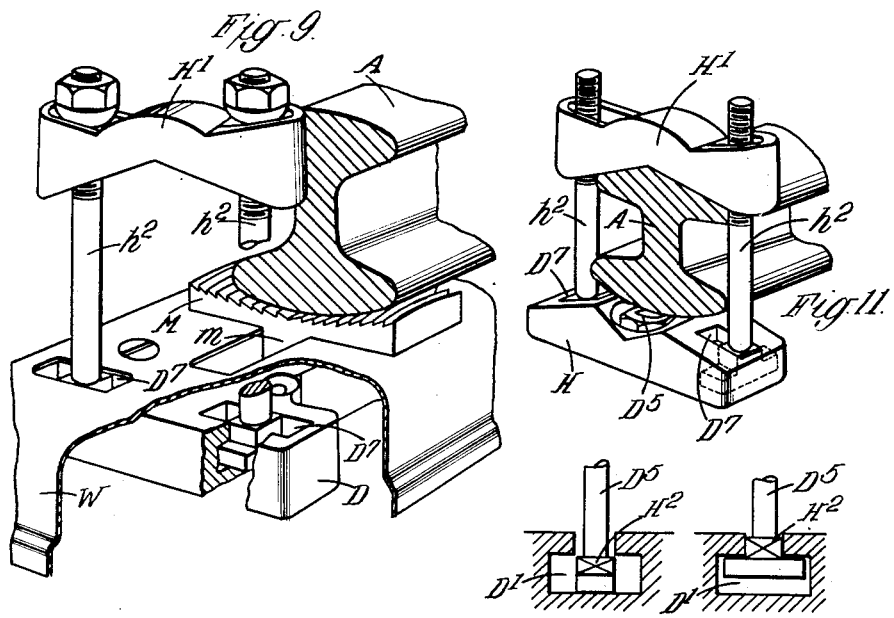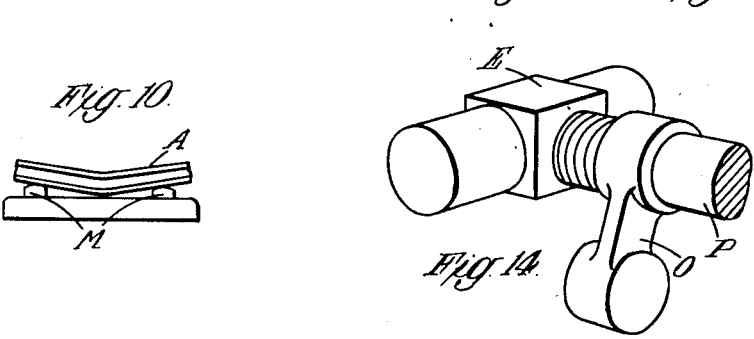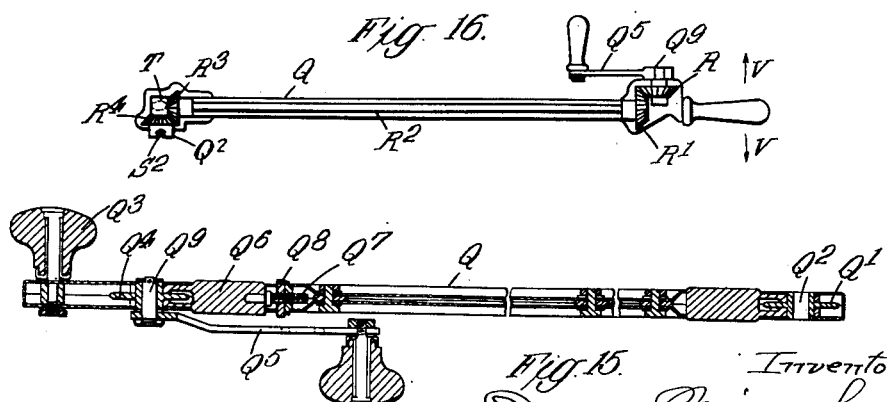

Patented Feb. 7, 1933

1,896,977

UNITED STATES PATENT OFFICE

DONALD WILFRED SESSIONS, OF FINCHLEY, LONDON, ENGLAND

LIFTING JACK FOR VEHICLES

Application filed July 14, 1930, Serial No. 467,864, and in Great Britain July 23, 1929.

This invention relates to lifting jacks more especially of the kind comprising one or more sets of four bars arranged in the form of a lazy-tongs or toggles device (adjacent bars acting as toggle levers) and a screw device for moving the pairs of outer ends of the bars towards or away from each other.

According to the invention the inner adjacent ends of the upper two bars are pivoted to connecting means whereby the jack can be secured to a suitable part of a vehicle and the inner adjacent ends of the lower two bars are pivotally connected to a plate or the like for resting on the ground or to a member to which the said plate or the like can be detachably secured. When the screw is operated to move the pairs of outer ends of the bars towards each other, the plate is first moved into contact with the ground and then the connecting means are raised so as to raise the vehicle. The connecting means may comprise a horizontal plate located between two sets of such bars and not extending substantially above the level of the highest portions of the bars when the jack is in the collapsed condition, and which plate serves as an anchor for bolts or the like whereby the jack is attached to the vehicle. The horizontal plate may be provided with two longitudinal slots of inverted T-shaped cross-section but recessed so that the heads of T-shaped bolts may be inserted in the recesses and then moved along into the slots, the bolts being secured to members suspended from the axle, spring, or other suitable part of the vehicle.

In order that the said invention may be clearly understood and readily carried into effect the same will now be described more fully with reference to the accompanying drawings, in which:—

Figure 1 is a side elevation of a lifting jack constructed in accordance with the invention and having two sets of bars.

Figures 2 and 3 are a plan and end view thereof respectively.

Figure 4 is a section on line IV—IV of Figure 1.

Figure 5 is a side elevation of the jack in the open condition.

Figures 6 and 7 illustrate in side and end view respectively one form of means for attaching the jack to the vehicle.

Figures 8, 9, 10 and 11 illustrate modifications of the means for attaching the jack to the vehicle.

Figures 12, 13 and 14 show details to be described, and

Figures 15 and 16 are longitudinal central sections of two forms of key for operating the jack screw.

The pairs of upper bars B, B$^1$ are pivoted at $b$, $b^1$ respectively, to the horizontal plate D, and at their outer ends are mounted on pivot studs $b^3$, $b^4$ carried by blocks E, E$^1$. The outer ends of the pairs of lower bars F, F$^1$, are also mounted on the studs $b^3$, $b^4$, and their inner ends are pivoted to vertical side plates F$^2$ forming part of a base member F$^3$, into which is threaded a stem F$^4$ of the plate F$^5$ for resting on the ground. The plate F$^5$ can be removed for substitution of a thicker plate. The inner ends of the bars are formed with toothed bosses, the teeth of the upper bars, and of the lower bars, of each set intermeshing so that equal and opposite movement of the bars is ensured. The teeth of the upper bars mesh with those of the lower bars when the jack is collapsed thereby facilitating collapse of the jack to a small height. Corresponding pairs of the upper bars are secured together by studs B$^4$ so that movement of the bars in unison is ensured and so that they are rendered more rigid. The studs B$^4$ are secured to projections or bosses B$^5$ on the bars so that the studs do not interfere with the complete collapsing movement of the upper and lower bars. The ends of the plate D are extended transversely over the bars B, B$^1$ and between these transverse ends the plate D is located between the two sets of bars: the bars B, B$^1$ are shaped to avoid their contacting with the transverse ends of the plate so as to permit complete collapse of the jack. By this arrangement the upper surface of the plate D does not extend substantially above the bars B, B$^1$ and the jack when collapsed occupies a small space vertically and presents a neat appearance beneath the vehicle. The plate D is formed with two longitudinal slots or grooves $D^1$, $D^2$, of inverted T-shaped cross-section, so that the heads of T-shaped bolts $D^5$, $D^6$, can be inserted in the recesses and then rotated so that their heads are engaged in the slots. The bolts $D^5$, $D^6$, are thus anchored in the plate D and means supported by the axle, spring, or other suitable part of the vehicle, are provided to which these bolts are secured. One form of such means is illustrated in Figures 6 and 7 and comprises two angular members or plates H each having a lower horizontal limb $h$, and upper limbs $h^1$ inclined to the horizontal so that their outer ends are lower than their inner ends. The limbs $h$ are clamped firmly to the plate D by the bolts $D^5$, $D^6$, the slots $D^1$, $D^2$ permitting adjustment of the bolts as may be desirable. Supporting bolts $h^2$ pass through slots in the limbs $h^1$ and through slots in corresponding limbs $h^3$ of a plate $H^1$ located above the spring J. The limbs $h^3$ are inclined upwardly, i. e. in the opposite direction to the limbs $h^1$, so that when the nuts $h^4$ are screwed home on the bolts $h^2$ the latter will slip towards each other and grip the spring J. In order that the bolts may move easily down the inclined limbs $h^1$, $h^3$, the latter are recessed, and the bolt heads are rounded as shown, and rounded washers $h^5$ are provided at their opposite ends. This arrangement is particularly suitable for attaching the jack to a rear axle spring as it provides a clearance for the spring bolts $h^6$. Alternatively the existing bolts which secure the axles to the springs may be utilized for supporting the jack as illustrated in Figure 8 wherein the lower ends of the two inverted U-shaped bolts K (one only of which is shown) which secure the axle A to the springs J are shown secured to the upper horizontal limbs $k^1$ of two angular members $K^1$, the lower limbs $k^2$ of which are secured to the T-bolts $D^5$, $D^6$. For securing the jack to the front axle the transverse ends of the horizontal plate are provided with transverse slots or grooves $D^7$, $D^8$, of similar cross-sectional shape to the slots $D^1$, $D^2$. The supporting bolts $h^2$ depending from the plate $H^1$ located above the axle A are formed with rectangular heads to be engaged in the slots $D^7$, $D^8$, (see Figures 2 and 9). The surfaces of the slots $D^7$, $D^8$, that are engaged by the bolt heads are inclined so that the bolts slip towards each other when they are tightened. This arrangement enables the jack to be secured to the axle in contact therewith. Instead of forming the plate D with the transverse ends the latter may be provided separately in the form of two plates H (see Figure 11 in which only one of these plates is illustrated) each having a central aperture through which the bolts $D^5$ or $D^6$ passes. The lower portions of the inverted T-shaped slots $D^1$, $D^2$, $D^7$, $D^8$, are made deep enough to permit the heads of the bolts $D^5$, $D^6$, $h^2$, to be inserted into the slots as shown in Figure 12 then rotated through an angle of 45° (in which position they cannot be removed from the slots) and raised so that square portions $H^2$ on their shanks engage the upper narrow parts of the slots and are thereby prevented from further rotary displacement. Alternatively the slots may be of less depth and recessed at their ends as indicated by dot and dash lines at X in Figure 2, the recess being large enough to permit rotation of the square portions $H^2$ therein. If the jack is secured to the centre of an axle a jaw M (see Figures 9 and 10) may be provided at each side of the centre between the jack and the axle, the upper surfaces of the jaw being serrated, V-shaped in end view, curved longitudinally of the jack, or otherwise suitably formed to ensure a firm bedding of the axle thereon. The jaws may be formed with downwardly projecting studs or tongues $m$ engaged in the slots $D^1$, $D^2$. Located centrally through the jack is a spindle P comprising a plurality of telescopic parts and having right and left threaded portions that are screwed through threaded apertures in the blocks E, $E^1$, respectively, so that when the spindle is rotated the blocks E, $E^1$, and consequently also the pairs of outer ends of the bars, will be moved towards or away from each other thus opening or collapsing the jack. Suitable provision may be made for preventing undesirable rotation of the operating screw due for example to vibration whilst the vehicle is in motion. These means may comprise spring washers N which are compressed between washers $N^1$ located against the blocks E, $E^1$ and shoulders or collars $N^2$ on the spindle P, when the jack is collapsed, or may comprise a weighted lever O (see Figure 14). The outer end of the screw spindle is suitably shaped to engage in a socket in a device for rotating it. One form of such device is illustrated in Figure 15 and comprises a casing Q of suitable length rotatably mounted at one end of which is a sprocket wheel $Q^1$ the spindle or boss of which is formed with a socket $Q^2$ for receiving the end of the jack screw spindle. Adjacent to the other end of the casing Q is a handle $Q^3$ which the user may hold to steady the device and a second sprocket wheel $Q^4$ mounted on a spindle $Q^9$ which can be rotated by a cranked handle $Q^5$. An endless chain (not shown) passes round the sprocket wheels $Q^1$, $Q^4$, so that rotation of the sprocket $Q^4$ by the handle $Q^5$ rotates the sprocket $Q^1$ and the jack screw spindle. A bearing for the spindle or boss of the sprocket $Q^4$ is formed in a block $Q^6$ which is adjustable by screw $Q^7$ and nut $Q^8$ towards and away from the sprocket $Q^1$ so as to take up any slack in the chain. In a modification of this device, illustrated in Figure 16, the spindle $Q^9$ carries at one end a bevel pinion R operating a second bevel pinion R¹ attached to the upper end of a spindle R² running longitudinally of the case Q said longitudinally disposed spindle having at its other end a bevel pinion R³ engaging a pinion R⁴ upon a socket or sleeve Q². It will be observed that in both of these forms of operating device the socket Q² is at right angles to the elongated member or casing Q so that the user can operate from the front of the car a jack which is secured to the front axle transversely of the car. If the socket Q² were in line with the casing Q it would be necessary to operate such a jack through the wheel of the car and this would not be feasible in the case of disc wheels or front wheel brakes. The outer end of the jack operating screw is preferably provided with a conical nose S and a transverse pin S¹. The conical nose facilitates its being placed in the socket Q² and the pin S¹ engages in slots S² the ends of which slots are recessed so that when the socket or sleeve Q² and screw spindle are rotating together there will be no likelihood of their becoming disengaged. The conical nose S engages in an elliptical recess T in the end of the operating device, thereby permitting movement of the device in the direction of the arrows V without disengagement of the nose S from the socket Q² and preventing strain due to such movement from being placed upon the casing Q, pin S¹, or other parts. Owing to the engagement of the larger part of the conical nose in the socket, however, movement of the device about the axis of the casing Q is prevented when the device is in use. If desired provision may be made, for example by means of a spring, whereby when the lower toggle bars are in an aligned position they may be subject to a certain amount of pressure which will tend to force their inner ends downwards. The jack may be enclosed by a suitable casing W (Figure 9) having slots corresponding to those in the plate D, the margin around the slots in the casing being preferably turned down into the slots in the plate and the square portions of the T-shaped bolts being made of suitable size.

What I claim and desire to secure by Letters Patent of the United States is:—

1. A lifting jack comprising two sets of four bars forming a toggle device in which adjacent bars in each set act as toggle levers, a horizontal plate located between the two sets and not extending substantially above the level of the highest portions of the bars when the jack is in the collapsed condition, said plate having slots therein of inverted T-shaped cross-section to receive the heads of bolts secured to a vehicle, the inner ends of the upper bars being pivoted to said plate, a plate adapted to rest on the ground to which the inner ends of the lower bars are pivoted, and a screw device for moving the outer ends of the bars towards and away from each other to cause extension and collapse of the jack.

2. A lifting jack comprising a plurality of sets of four bars forming a toggle device in which adjacent bars in each set act as toggle levers, a member to which the inner ends of the upper bars is pivoted, said member being located beneath a suitable part of the vehicle, a second member located above said part, supporting bolts for clamping the members against said part, said members having oppositely inclined surfaces arranged so that the supporting bolts as they are tightened move inwards and grip said part.

3. A lifting jack as in claim 2, wherein the supporting bolts are provided with rounded portions to facilitate their inward movement.

4. A lifting jack as in claim 2, wherein the members are recessed to receive rounded portions on the supporting bolts to facilitate their inward movement.

5. A lifting jack comprising a plurality of sets of four bars forming a toggle device in which adjacent bars in each set act as toggle levers, teeth on the inner ends of the bars, the teeth on the upper bars of each set intermeshing, the teeth on the lower bars of each set also intermeshing, and the teeth of the upper bars meshing with the teeth of the lower bars when the jack is collapsed, means for connecting the jack to a suitable part of a vehicle to which means the inner ends of the upper bars are pivoted, a plate adapted to rest on the ground to which the inner ends of the lower bars are pivoted, and a screw device for moving the outer ends of the bars towards and away from each other to cause extension and collapse of the jack.

6. A lifting jack comprising two sets of four bars forming a toggle device in which adjacent bars in each set act as toggle levers, teeth on the inner ends of the bars, the teeth on the upper bars of each set intermeshing, the teeth on the lower bars of each set also intermeshing, and the teeth of the upper bars meshing with the teeth of the lower bars when the jack is collapsed, a horizontal plate located between the two sets and not extending substantially above the level of the highest portions of the bars when the jack is in the collapsed condition, said plate having slots therein of inverted T-shaped cross-section to receive the heads of bolts secured to a vehicle, the inner ends of the upper bars being pivoted to said plate, a plate adapted to rest on the ground to which the inner ends of the lower bars are pivoted, and a screw device for moving the outer ends of the bars towards and away from each other to cause extension and collapse of the jack.

7. A lifting jack comprising two sets of four bars forming a toggle device in which adjacent bars in each set act as toggle levers, teeth on the inner ends of the bars, the teeth on the upper bars of each set intermeshing, the teeth on the lower bars of each set also intermeshing, and the teeth of the upper bars meshing with the teeth of the lower bars when the jack is collapsed, a horizontal plate located between the two sets and not extending substantially above the level of the highest portions of the bars when the jack is in the collapsed condition, said plate serving as an anchor for bolts whereby the jack is secured to a vehicle, a base member located between said sets to which member the inner ends of the lower bars are pivoted, said plate and member contacting to limit the collapsing movement of the jack, and a screw device for moving the outer ends of the bars towards and away from each other to cause extension and collapse of the jack.

8. A lifting jack comprising a plurality of sets of four bars, pivot pins by which said bars are pivoted together to form a toggle device in which adjacent bars in each set act as toggle levers, upwardly extending projections on the upper bars, studs securing together the projections of corresponding upper bars of adjacent sets so as not to interfere with the collapsing of the jack, means for connecting the jack to a suitable part of a vehicle to which means the inner ends of the upper bars are pivoted, a plate adapted to rest on the ground to which the inner ends of the lower bars are pivoted, and a screw device attached to the said pivot pins on opposite sides of the jack for moving the outer ends of the bars towards and away from each other to cause extension and collapse of the jack.

9. A lifting jack comprising two sets of four bars forming a toggle device in which adjacent bars in each set act as toggle levers, teeth on the inner ends of the bars, the teeth on the upper bars of each set intermeshing, the teeth on the lower bars of each set also intermeshing, and the teeth of the upper bars meshing with the teeth on the lower bars when the jack is collapsed, a horizontal plate located between the two sets and not extending substantially above the level of the highest portions of the bars when the jack is in the collapsed condition, said plate serving as an anchor for bolts whereby the jack is secured to a vehicle, a base member located between said sets to which member the inner ends of the lower bars are pivoted, said plate and member contacting to limit the collapsing movement of the jack, and a screw device for moving the outer ends of the bars towards and away from each other to cause extension and collapse of the jack.

10. A lifting jack comprising a plurality of sets of four bars forming a toggle device in which adjacent bars in each set act as toggle levers, means for connecting the jack to a suitable part of a vehicle to which means the inner ends of the upper bars are pivoted, a plate adapted to rest on the ground to which the inner ends of the lower bars are pivoted, and a screw device for moving the outer ends of the bars towards and away from each other to cause extension and collapse of the jack, spring washers, and means to compress the spring washers when the jack is collapsed to prevent inadvertent operation of the screw device.

11. A lifting jack comprising a plurality of sets of four bars forming a toggle device in which adjacent bars in each set act as toggle levers, upwardly extending projections on the upper bars, studs securing together the projections of corresponding upper bars of adjacent sets so as not to interfere with the collapsing of the jack, means for connecting the jack to a suitable part of a vehicle to which means the inner ends of the upper bars are pivoted, a plate adapted to rest on the ground to which the inner ends of the lower bars are pivoted, a screw device for moving the outer ends of the bars towards and away from each other to cause extension and collapse of the jack, spring washers, and means to compress the spring washers when the jack is collapsed to prevent inadvertent operation of the screw device.

12. A lifting jack comprising two sets of four bars forming a toggle device in which adjacent bars in each set act as toggle levers, a horizontal plate substantially the whole of which is located between the two sets of bars and which plate does not extend substantially above the level of the highest portion of the bars when the jack is in the collapsed condition said plate having at least one recess in its upper surface not extending completely through the plate and adapted to receive and retain the heads of bolts whereby the jack is attached to a vehicle, the inner ends of the upper bars being pivotally attached against the outside of said plate, a plate adapted to rest on the ground to which the inner ends of the lower bars are pivoted, and a screw device for moving the outer ends of the bars towards and away from each other to cause extension and collapse of the jack.

13. A lifting jack comprising two sets of four bars forming a toggle device in which adjacent bars in each set act as toggle levers, a horizontal plate substantially the whole of which is located between the two sets of bars and which plate does not extend substantially above the level of the highest portion of the bars when the jack is in the collapsed condition said plate having transversely and longitudinally disposed slots in its upper surface not extending completely through the plate and adapted to receive and retain the heads of bolts whereby the jack is attached to a vehicle, the inner ends of the upper bars being pivotally attached against the outside of said plate, a plate adapted to rest on the ground to which the inner ends of the lower bars are pivoted, and a screw device for moving the outer ends of the bars towards and away from each other to cause extension and collapse of the jack.

DONALD WILFRED SESSIONS.